Patented Oct. 17, 1950

2,525,860

UNITED STATES PATENT OFFICE 2,525,860

PHOSPHORS AND X-RAY SCREENS PREPARED THEREFROM

William H. Byler and John W. Wilson, Morris Plains, N. J.

No Drawing. Application July 13, 1946, Serial No. 683,418

4 Claims. (Cl. 252—301.6)

This invention relates to improved phosphors with a high degree of fluorescence and relatively low phosphorescence.

Intensifying and viewing screens for X-rays, and various other types of fluorescent screens responsive to X-ray or other type of excitation, are frequently made with a phosphor, i. e., luminous material, consisting essentially of zinc sulfide, including zinc-cadmium sulfide as the fluorescent material. The term "zinc-sulfide" as used herein includes zinc-cadmium sulfide, unless the context indicates the contrary. Commonly, the phosphor is activated by the inclusion in it of a small amount of silver. Other metals such as copper, gold and manganese may be included to modify the characteristics of the fluorescent response. In some applications, the phosphorescence, that is continued glowing after the source of excitation is cut off, is objectionable, particularly if pronounced or long continued. The inclusion in the phosphor of small quantities of nickel has been suggested to reduce the phosphorescence to a desired level without undue reduction of the fluorescent response.

In general, in the production of phosphors, scrupulous care is taken to avoid the presence in the phosphor of any heavy metals other than those added deliberately to activate the phosphor or change the nature of the response, or, as in the case of nickel, to reduce the phosphorescence somewhat.

The present invention is based upon the discovery that extremely small quantities of the metals of rhodium and palladium are effective in reducing the phosphorescence of zinc and zinc-cadmium sulfide phosphors, without undue reduction of the fluorescent response of the phosphors, and in some cases, with an increase in the responsiveness of the phosphor to excitation by X-rays. These metals may be used alone as modifying agents to reduce the phosphorescence of these phosphors, or may be used in admixture.

These metals are effective in reducing phosphorescence in extremely small quantities. Thus, rhodium in concentrations in the phosphor below 1:10,000,000 markedly reduces the phosphorescence of a silver activated zinc or zinc-cadmium sulfide phosphor. Palladium is slightly less effective than rhodium but still active at these extremely low concentrations.

These metals, effective at the extremely low levels of concentration referred to do not increase greatly in effective repression of phosphorescence as their concentration increases. Thus, a major part of their effectiveness is exhibited at very low concentrations such as 1:10,000,000, and even at concentrations as high as 1:100,000 they do not exert a repressing effect on phosphorescence very much greater than that at the lower concentrations. In the practice of the present invention, these metals are included in the phosphor in concentrations of less than 1:100,000, although a major portion of their effectiveness can be obtained at very much lower concentrations than this.

The phosphors which are included in the invention are prepared in the usual way from carefully purified zinc sulfide or zinc-cadmium sulfide, calcined at the appropriate temperature, usually with the use of a fluxing material such as sodium chloride and with inclusion in the phosphor of an activating agent or phosphorogen such as silver if desired, an agent such as gold, copper or manganese if desired, and the phosphorescence repressing agent of the invention in the proportions selected, below 1:100,000. The amount of silver may vary from one part in 3000 to one part in 100,000, one part in 20,000 giving good results. The amount of copper or gold, if any, should not exceed one part in 100,000 and the amount of managanese, if any, one part in 10,000. The calcined product, if for a screen or the like, is then applied to the screen or other article in the usual way, as by mixing it with a suitable adhesive or lacquer. The invention will be illustrated by the following example but it is not limited thereto.

*Example.*—A luminous material is prepared by the usual procedure by precipitation of zinc sulfide from solutions as free as possible from heavy metal impurities. The precipitated zinc sulfide is filtered and dried with care to prevent the introduction of heavy metals. Enough silver nitrate solution to give a silver content of about 1:20,000 and enough rhodium chloride to give a rhodium content of from 1:10,000,000, to 1:1,000,000 are added. A few parts per hundred of one or more of the usual fluxing salts are then added. The mixture is dried and fired in a silica crucible at a temperature of 900 to 1300° C. The time and temperature of firing are determined by the grain size required for the proper balance of brightness and definition in the final product in accordance with the usual practice. If desired the color of the luminous product may be shifted toward the red by the addition of small quantities of copper, manganese or gold along with the silver. The resulting luminous material has a phosphorescence which is very much less than that of a material prepared in a similar fashion but without the rhodium. Substitution of palladium for the rhodium gives products with decreased phosphorescence as compared with substantially a material not containing such a metal. Mixtures of these metals may be used, their action being substantially additive, and the concentration of such metal may be less than 1:10,000,000 and may range up to about 1:100,000.

Similarly, products with decreased phosphorescence may be prepared using a zinc cadmium sulfide phophor, following the procedure outlined in the example, by preparing the phosphor by the admixture of precipitated zinc and cadmium sulfides in appropriate proportions in accordance with the usual practice, for example, using 25% of cadmium sulfide and 75% of zinc sulfide or using higher or lower proportions of cadmium sulfide, and combining the product with the desired activating or color modifying agents, and either of the metals rhodium or palladium in the proportions specified above.

We claim:

1. A zinc-sulfide phosphor containing a phosphorescence inhibitor selected from the group consisting of rhodium and palladium, the amount of said phosphorescence inhibitor being less than one part in 100,000.

2. A zinc-cadmium sulfide phosphor containing a phosphorescence inhibitor selected from the group consisting of rhodium and palladium, the amount of said phosphorescence inhibitor being less than one part in 100,000.

3. A fluorescent screen including a phosphor as defined in claim 1.

4. A fluorescent screen including a phosphor as defined in claim 2.

WILLIAM H. BYLER.
JOHN W. WILSON.

REFERENCES CITED

The following references are of record in the file of this patent:

FOREIGN PATENTS

| Number | Country | Date |
|---|---|---|
| 843,200 | France | June 28, 1939 |

Certificate of Correction

Patent No. 2,525,860                                               October 17, 1950

WILLIAM H. BYLER ET AL.

It is hereby certified that error appears in the printed specification of the above numbered patent requiring correction as follows:

Column 3, line 5, strike out the word "substantially" and insert the same in line 4, before "decreased"; line 12, for "phophor" read *phosphor*; column 4, list of references cited, under FOREIGN PATENTS, for "843,200" read *843,300*;

and that the said Letters Patent should be read as corrected above, so that the same may conform to the record of the case in the Patent Office.

Signed and sealed this 16th day of January, A. D. 1951.

[SEAL]

THOMAS F. MURPHY,
*Assistant Commissioner of Patents.*